(12) United States Patent
Chen et al.

(10) Patent No.: US 11,586,312 B1
(45) Date of Patent: Feb. 21, 2023

(54) TOUCH MODULE AND METHOD OF MANUFACTURING THE SAME

(71) Applicant: TPK Advanced Solutions Inc., Fujian (CN)

(72) Inventors: Xiang Mei Chen, Xiamen (CN); Lian Jie Ji, Xiamen (CN); Lien-Hsin Lee, Taipei (TW); Tai-Shih Cheng, Taipei (TW)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/523,217

(22) Filed: Nov. 10, 2021

(51) Int. Cl.
*G06F 3/041* (2006.01)

(52) U.S. Cl.
CPC .. *G06F 3/0412* (2013.01); *G06F 2203/04103* (2013.01); *G06F 2203/04111* (2013.01)

(58) Field of Classification Search
CPC ............................................ G06F 2203/04111
See application file for complete search history.

(56) References Cited

U.S. PATENT DOCUMENTS

| | | | |
|---|---|---|---|
| 2011/0141037 A1* | 6/2011 | Hwang | G06F 3/0446 345/173 |
| 2012/0081334 A1* | 4/2012 | Kim | G06F 3/0445 345/174 |
| 2015/0022739 A1* | 1/2015 | Chen | G06F 3/0446 349/12 |
| 2018/0011385 A1* | 1/2018 | Kang | G02F 1/157 |
| 2018/0323240 A1 | 11/2018 | Won et al. | |

FOREIGN PATENT DOCUMENTS

| | | |
|---|---|---|
| CN | 111665971 A | 9/2020 |
| TW | I480999 B | 4/2015 |
| TW | 201543284 A | 11/2015 |
| TW | 201806752 A | 3/2018 |

\* cited by examiner

*Primary Examiner* — Robin J Mishler
(74) *Attorney, Agent, or Firm* — Cooper Legal Group, LLC (57) ABSTRACT

A touch module includes a substrate, a bridging pattern layer, first and second insulating layers, and an electrode pattern layer. The bridging pattern layer, disposed on the substrate, includes a bridging electrode. The first insulating layer, disposed on the bridging pattern layer, includes first and second insulating blocks respectively formed at opposite ends of the bridging electrode and a third insulating block separately located between the first and second insulating blocks by two exposed regions of the first insulating layer. The electrode pattern layer, disposed on the first insulating layer, is electrically connected to the bridging electrode through the two exposed regions. The electrode pattern layer includes first and second transparent conductive layers and a metal layer and has two through hole regions directly above the bridging electrode. The second insulating layer, disposed on the electrode pattern layer, covers and fills the two through hole regions.

20 Claims, 10 Drawing Sheets

TOUCH MODULE AND METHOD OF MANUFACTURING THE SAME

BACKGROUND

Technical Field

The present disclosure relates to a touch module and a method of manufacturing the same.

Description of Related Art

With the continuous expansion of the size of touch display devices and the indispensability of gaming applications, the most critical change is the continuous improvement of the refresh rate of the display. For example, the refresh rate of the screen of a mobile phone will be increased from 120 Hz to 180 Hz, or even to a higher level of 240 Hz (for example, a mobile phone with an organic light emitting diode (OLED) display has a higher screen refresh response speed). As for the screen refresh rate of high-end notebook computers, there is also a demand for improvement.

Figure 9:
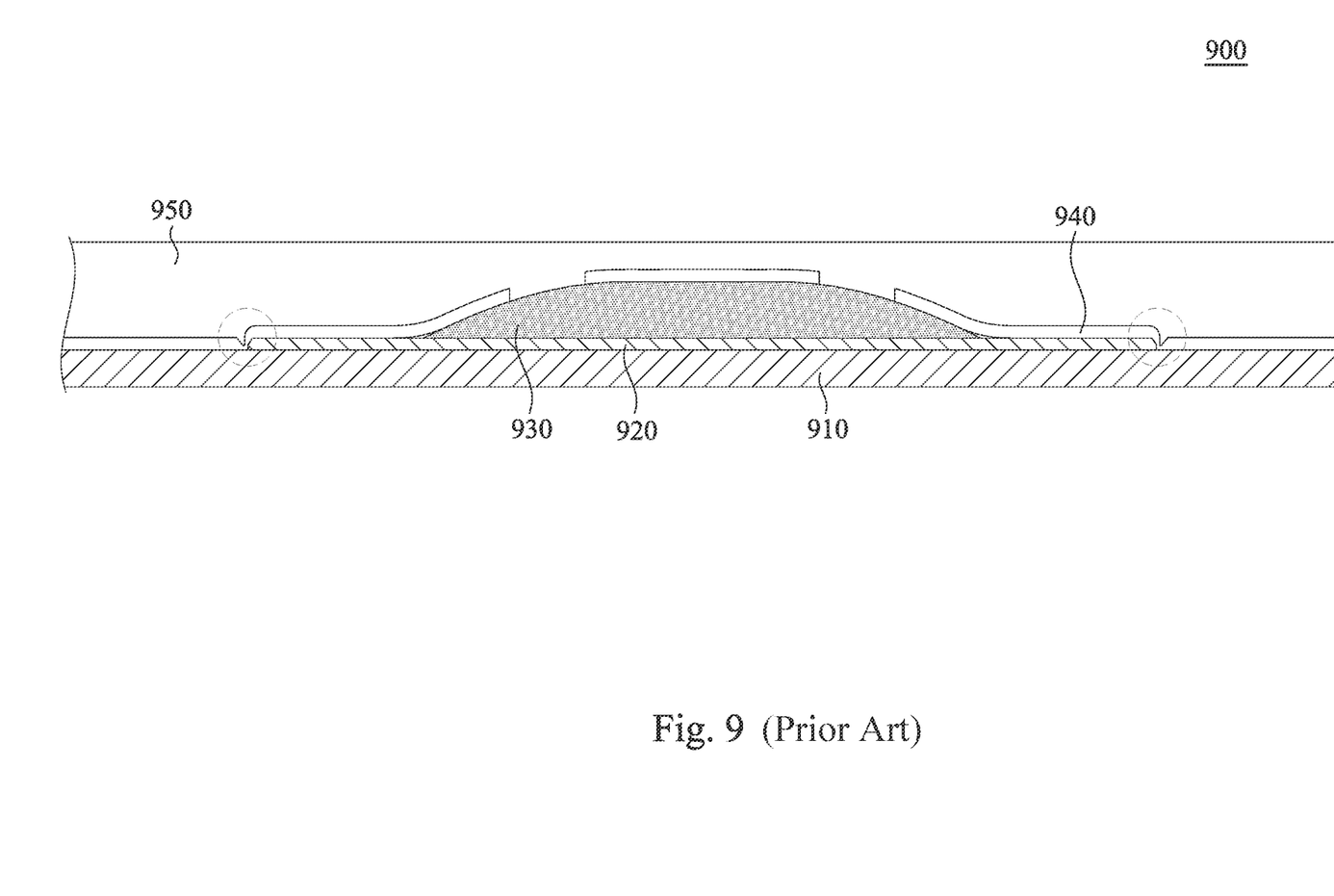
FIG. 9 is a schematic diagram of an existing touch module.

However, for traditional One Glass Solution (OGS) touch panels simply using indium tin oxide (ITO) to manufacture electrodes, since the RC value cannot be effectively reduced, the refresh rate cannot be satisfied when the application is developed from small size to large-sized. Taiwan Patent No. TW I480999 teaches to dispose composite electrodes on both sides of a substrate to effectively reduce manufacturing costs and effectively improve conductivity. In addition, as shown in FIG. 9, an existing touch module 900 includes a substrate 910, a bridging pattern layer 920, a first insulating layer 930, an electrode pattern layer 940, and a second insulating layer 950. However, for the OGS architecture (that is, the base plane of the glass is used as the single-sided bridging touch electrode formation surface), cracks are likely to occur in the electrode pattern layer 940 where the electrode pattern layer 940 climbs the bridging pattern layer 920 (marked by the dotted line in the figure). In particular, under the architecture with the base plane of the glass as the formation surface, the use of a composite electrode layer made on one side (i.e., OGS-SITO structure; single side) will inevitably face the problem of how to reduce or avoid cracks when the electrode layer has a height difference in the space. Therefore, there will be a design of a thickness adjustment portion based on the formation surface of the glass in the structure. If the OGS-SITO architecture is compared with in-cell architecture, the pixels of the in-cell architecture have an undulating formation surface due to the thin film transistor, so it is not necessary to form an additional thickness adjustment portion on the plane. U.S. Patent Application No. 20180323240A1 discloses an example of an OLED display device using In-cell touch technology, in which the transparent conductive layer covers the opaque conductive layer, so that the light transmittance is limited. Therefore, the structure is obviously different from the display device using OGS-SITO technology, and the spatially irregular thickness adjustment portion in the pixel is not easy to be transferred to the flat formation surface of the glass of the OGS-SITO architecture.

Accordingly, how to provide a touch module and a method of manufacturing the same to solve the aforementioned problems becomes an important issue to be solved by those in the industry.

SUMMARY

An aspect of the disclosure is to provide a touch module and a method of manufacturing the same that can efficiently solve the aforementioned problems.

According to an embodiment of the disclosure, a touch module includes a substrate, a bridging pattern layer, a first insulating layer, an electrode pattern layer, and a second insulating layer. The bridging pattern layer is disposed on the substrate and includes a bridging electrode. The first insulating layer is disposed on the bridging pattern layer and has two exposed regions respectively adjacent to opposite ends of the bridging electrode. The first insulating layer includes a first insulating block and a second insulating block respectively formed at the opposite ends of the bridging electrode and a third insulating block separately located between the first insulating block and the second insulating block by the two exposed regions. The electrode pattern layer is disposed on the first insulating layer and is electrically connected to the bridging electrode through the two exposed regions. The electrode pattern layer includes a first transparent conductive layer, a metal layer, and a second transparent conductive layer that are sequentially stacked and respectively have a first resistance value, a second resistance value, and a third resistance value. The electrode pattern layer has two through hole regions directly above the bridging electrode. The second insulating layer is disposed on the electrode pattern layer and covers and fills the two through hole regions.

In an embodiment of the disclosure, the first insulating block, the second insulating block, and the third insulating block have slopes.

In an embodiment of the disclosure, the two through hole regions are connected to the third insulating block and across opposites sides of the third insulating block.

In an embodiment of the disclosure, the two exposed regions are across opposite sides of the bridging electrode.

In an embodiment of the disclosure, the electrode pattern layer includes two first electrode blocks and a second electrode block. The first electrode blocks are electrically connected to the bridging electrode respectively through the two exposed regions. The second electrode block is separately located between the first electrode blocks by the two through hole regions.

In an embodiment of the disclosure, the bridging pattern layer includes a copper oxide layer disposed on the substrate.

In an embodiment of the disclosure, the bridging pattern layer further includes a metal layer stacked on the copper oxide layer.

In an embodiment of the disclosure, the bridging pattern layer further includes a transparent oxide conductive layer stacked on the metal layer.

In an embodiment of the disclosure, the first transparent conductive layer is a first transparent oxide conductive layer. The second transparent conductive layer is a second transparent oxide conductive layer.

In an embodiment of the disclosure, at least one of the first transparent oxide conductive layer or the second transparent oxide conductive layer has a first region and a second region. An oxygen content of the first region is greater than an oxygen content of the second region.

In an embodiment of the disclosure, the second region is located between the first region and the metal layer.

In an embodiment of the disclosure, the bridging pattern layer further includes a peripheral bonding electrode. The first insulating layer further includes a wall structure. The wall structure is disposed on the peripheral bonding electrode and surrounds to form another exposed region. The electrode pattern layer is electrically connected to the peripheral bonding electrode at least via the another exposed region. The wall structure has at least one drain trench running through the wall structure.

In an embodiment of the disclosure, the electrode pattern layer is further electrically connected to the peripheral bonding electrode via the at least one drain trench.

According to an embodiment of the disclosure, a method of manufacturing a touch module includes: forming a bridging pattern layer on a substrate, in which the bridging pattern layer includes a bridging electrode; forming a first insulating layer on the bridging pattern layer, in which the first insulating layer has two exposed regions respectively adjacent to opposite ends of the bridging electrode, and the first insulating layer includes a first insulating block and a second insulating block respectively formed at the opposite ends of the bridging electrode and a third insulating block separately located between the first insulating block and the second insulating block by the two exposed regions; forming an electrode pattern layer on the first insulating layer such that the electrode pattern layer is electrically connected to the bridging electrode through the two exposed regions, in which the electrode pattern layer includes a first transparent conductive layer, a metal layer, and a second transparent conductive layer that are sequentially stacked and respectively have a first resistance value, a second resistance value, and a third resistance value; forming two through hole regions in the electrode pattern layer and directly above the bridging electrode; and forming a second insulating layer on the electrode pattern layer to cover and fill the two through hole regions.

In an embodiment of the disclosure, the step of forming the first insulating layer on the bridging pattern layer includes: forming an insulating material on the bridging pattern layer; and etching the two exposed regions in the insulating material, so as to form the first insulating block, the second insulating block, and the third insulating block.

In an embodiment of the disclosure, the step of etching the two exposed regions in the insulating material makes the first insulating block, the second insulating block, and the third insulating block have slopes.

In an embodiment of the disclosure, the step of forming the two through hole regions in the electrode pattern layer and directly above the bridging electrode includes: etching the two through hole regions in the electrode pattern layer, so that the two through hole regions are connected to the third insulating block and across opposites sides of the third insulating block.

In an embodiment of the disclosure, the first transparent conductive layer is a first transparent oxide conductive layer. The second transparent conductive layer is a second transparent oxide conductive layer. The step of forming the electrode pattern layer on the first insulating layer includes: forming a first region of at least one of the first transparent oxide conductive layer or the second transparent oxide conductive layer with a first oxygen flux; and forming a second region of the at least one of the first transparent oxide conductive layer or the second transparent oxide conductive layer with a second oxygen flux smaller than the first oxygen flux.

In an embodiment of the disclosure, the step of forming the bridging pattern layer on the substrate makes the bridging pattern layer further include a peripheral bonding electrode. The step of forming the first insulating layer on the bridging pattern layer further includes: forming an insulating material on the bridging pattern layer; etching the insulating material to form a wall structure on the peripheral bonding electrode, in which the wall structure surrounds to form another exposed region; and etching the wall structure to form at least one drain trench running through the wall structure.

In an embodiment of the disclosure, the step of forming the electrode pattern layer on the first insulating layer makes the electrode pattern layer be electrically connected to the peripheral bonding electrode via the another exposed region and the at least one drain trench.

Accordingly, in the touch module of the present disclosure, since the electrode pattern layer is a composite conductive structure including two transparent oxide conductive layers with a larger resistance value and a metal layer with a smaller resistance value sandwiched between them, the resistance value of the circuit in the touch module can be effectively reduced, so that the touch module is suitable for use in medium and large-sized products. More importantly, for the composite conductive structure that is prone to cracks during multilayer formation, the present disclosure teaches that by making the first insulating layer include three insulating blocks having buffer slopes (used to improve the degree of adhesion between layers in thin film processes such as vapor deposition/coating, etc., to improve film formation at turning points) and being arranged on the bridging electrode along the extending direction of the bridging electrode, the problem of cracks in the electrode pattern layer disposed on the first insulating layer can be effectively improved. By adding a copper oxide layer to the bridging pattern layer, the visual effect can be effectively improved. By arranging the drain trenches on the wall structure where the first insulating layer is disposed on the peripheral bonding electrode, the strong etching solution used to etch the electrode pattern layer can be drained, thereby reducing the problem of over-corrosion.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
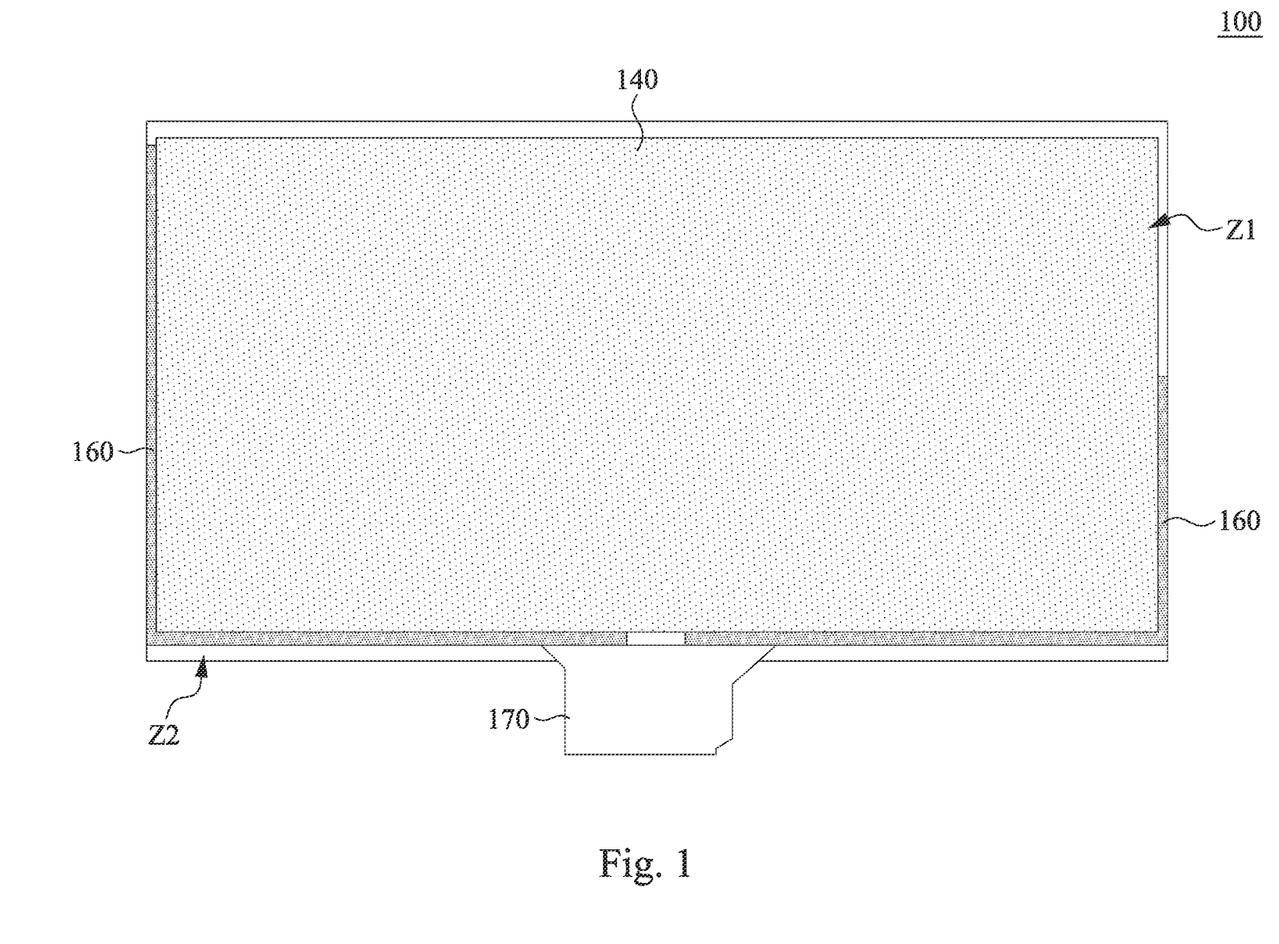
FIG. 1 is a schematic diagram of a touch module according to an embodiment of the present disclosure.

Reference is made to FIG. 1. FIG. 1 is a schematic diagram of a touch module 100 according to an embodiment of the present disclosure. As shown in FIG. 1, in the present embodiment, the touch module 100 includes a substrate 110, a touch electrode layer, a plurality of traces 160, and a flexible circuit board 170. A touch zone Z1 and a peripheral zone Z2 are defined on the substrate 110. The peripheral zone Z2 is located at the outer edge of the touch zone Z1. The touch electrode layer is disposed in the touch zone Z1. The traces 160 are located in the peripheral zone Z2, and two ends of each of the traces 160 are respectively connected to the touch electrode layer and the flexible circuit board 170, so as to transmit touch signals generated by the touch electrode layer to the flexible circuit board 170.

In some embodiments, a material of the substrate 110 includes glass, but the disclosure is not limited in this regard.

Figure 2:
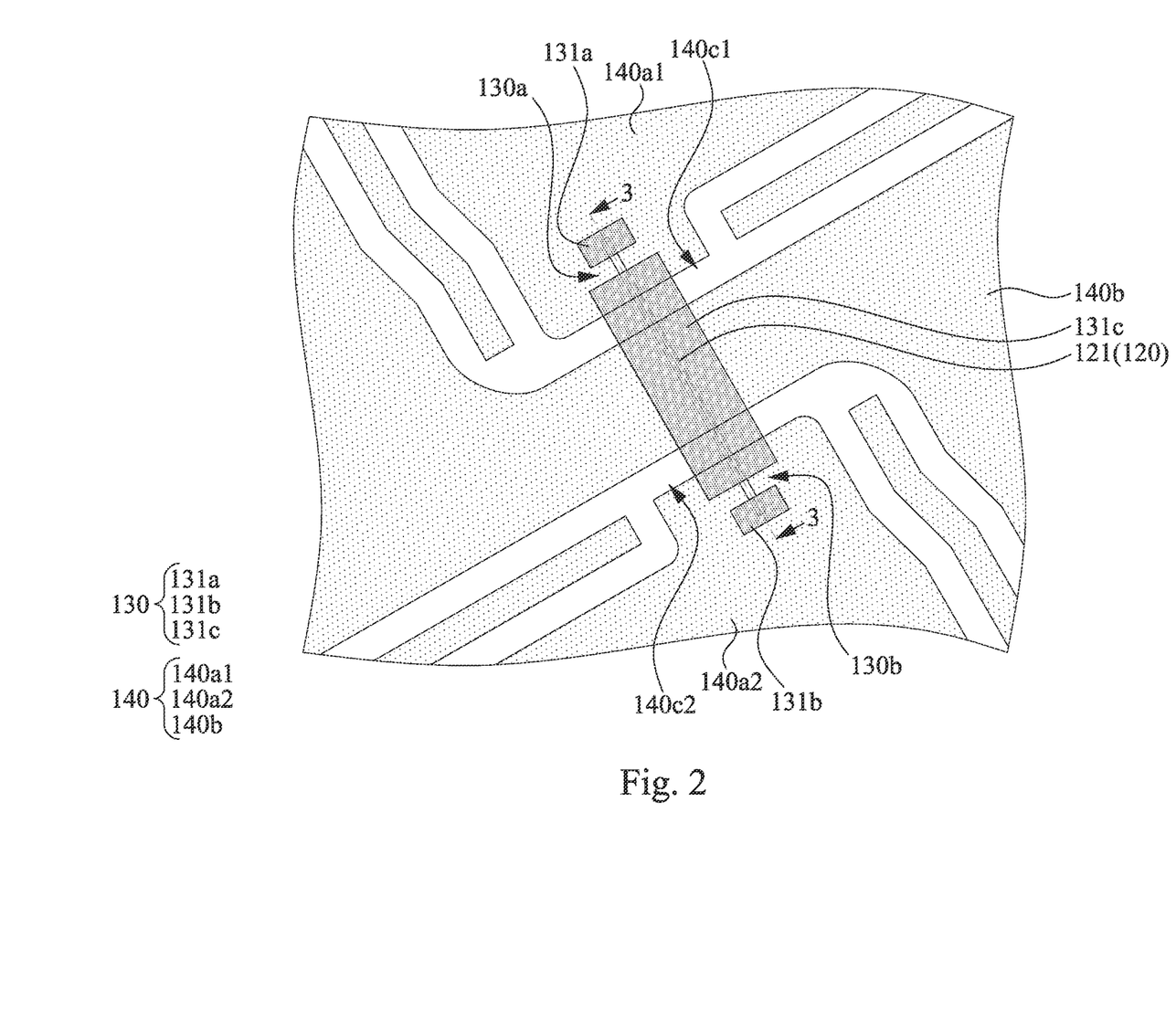
FIG. 2 is a partial enlarged view of the touch module in FIG. 1.
Figure 3:
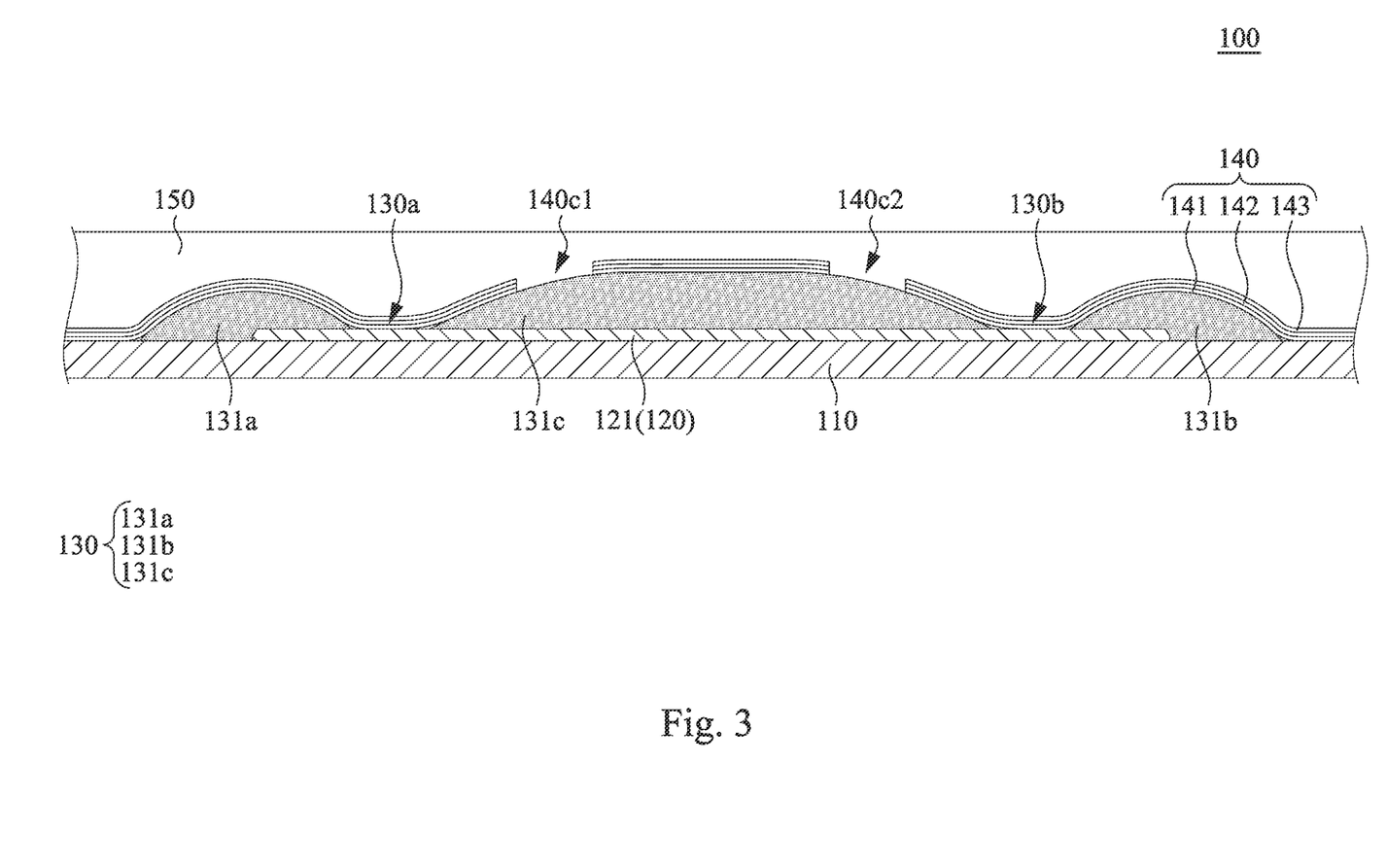
FIG. 3 is a cross-sectional view of the structure in FIG. 2 taken along line 3-3.

Reference is made to FIGS. 2 and 3. FIG. 2 is a partial enlarged view of the touch module 100 in FIG. 1. FIG. 3 is a cross-sectional view of the structure in FIG. 2 taken along line 3-3. As shown in FIGS. 2 and 3, in the present embodiment, the touch electrode layer includes a bridging pattern layer 120 and an electrode pattern layer 140. The touch module 100 further includes a first insulating layer 130 and a second insulating layer 150. The bridging pattern layer 120 is disposed on the substrate 110 and includes a plurality of bridging electrodes 121. Hereinafter, one of the bridging electrodes 121 is used for description. The first insulating layer 130 is disposed on the bridging pattern layer 120 and has two exposed regions 130a, 130b respectively adjacent to opposite ends of the bridging electrode 121. The electrode pattern layer 140 is disposed on the first insulating layer 130 and is electrically connected to the bridging electrode 121 through the exposed regions 130a, 130b. The electrode pattern layer 140 has two through hole regions 140c1, 140c2 directly above the bridging electrode 121. The second insulating layer 150 is disposed on the electrode pattern layer 140 and covers and fills the through hole regions 140c1, 140c2.

In some embodiments, a thickness of the first insulating layer 130 is about 1.25 μm, and a thickness of the second insulating layer 150 is about 2 μm, but the disclosure is not limited in this regard.

In detail, as shown in FIGS. 2 and 3, in the present embodiment, the electrode pattern layer 140 includes two first electrode blocks 140a1, 140a2 and a second electrode block 140b. The first electrode blocks 140a1, 140a2 are electrically connected to the bridging electrode 121 respectively through the exposed regions 130a, 130b. The second electrode block 140b is separately located between the first electrode blocks 140a1, 140a2 by the through hole regions 140c1, 140c2. Hence, the two first electrode blocks 140a1, 140a2 can transmit touch signals through the bridging electrode 121 and are electrically isolated from the second electrode block 140b.

In some embodiments, the electrode pattern layer 140 includes a plurality of first-axis conductive units spaced apart from each other and a plurality of second-axis conductive units spaced apart from each other and across the first-axis conductive units. Specifically, the aforementioned "first-axis" and "second-axis" respectively are, for example, two axes (for example, the Y axis and the X axis) that are perpendicular to each other. In other words, the first-axis conductive units are conductive lines extending along the first axis and arranged at intervals. The combination of the two first electrode blocks 140a1, 140a2 and the bridging electrode 121 is a part of one of the first-axis conductive units. The second-axis conductive units are conductive lines extending along the second axis and arranged at intervals. The second electrode block 140b is one of the second-axis conductive units, which crosses the opposite sides of the bridging electrode 121 (with the first insulating layer 130 therebetween). It can be seen that the through hole regions 140c1, 140c2 cross the opposite sides of the first insulating layer 130 and divide the electrode pattern layer 140 into the first electrode blocks 140a1, 140a2 and the second electrode block 140b.

As shown in FIG. 3, in the present embodiment, the electrode pattern layer 140 includes a first transparent oxide conductive layer 141 (i.e., a first transparent conductive layer), a metal layer 142, and a second transparent oxide conductive layer 143 (i.e., a second transparent conductive layer) that are sequentially stacked and respectively have a first resistance value, a second resistance value, and a third resistance value. The first resistance value and the third resistance value are greater than the second resistance value. By forming the touch electrode layer with the electrode pattern layer 140 having the composite conductive structure, the resistance of the circuits in the touch module 100 can be effectively reduced, so that the touch module 100 is suitable for use in medium and large-sized products.

In some embodiments, materials of the first transparent oxide conductive layer 141 and the second transparent oxide conductive layer 143 include indium tin oxide (ITO). Hence, the first transparent oxide conductive layer 141 and the second transparent oxide conductive layer 143 can have good light transmittance. In some embodiments, a material of the metal layer 142 includes silver, but the disclosure is not limited in this regard. In some embodiments, the metal layer 142 may be a nano-silver ink layer, a nano-silver paste layer, or a nano-sputter layer, but the disclosure is not limited in this regard. Hence, the metal layer 142 can have a lower resistance.

In some embodiments, a thickness of the first transparent oxide conductive layer 141 is about 40 nm, but the present disclosure is not limited in this regard. In some embodiments, a thickness of the metal layer 142 is about 8.5 nm to about 9.5 nm, but the disclosure is not limited in this regard. In some embodiments, a thickness of the second transparent oxide conductive layer 143 is about 40 nm, but the disclosure is not limited in this regard.

As shown in FIGS. 2 and 3, in the present embodiment, the first insulating layer 130 includes a first insulating block 131a and a second insulating block 131b respectively formed at the opposite ends of the bridging electrode 121, and a third insulating block 131c separately located between the first insulating block 131a and the second insulating block 131b by the exposed regions 130a, 130b. In detail, the first insulating block 131a and the second insulating block 131b respectively cover the opposite ends of the bridging electrode 121 without exposing the opposite ends of the bridging electrode. The first insulating block 131a, the third insulating block 131c, and the second insulating block 131b sequentially cover the bridging electrode 121 along the extending direction of the bridging electrode 121. The exposed regions 130a, 130b are respectively formed between the first insulating block 131a and the third insulating block 131c and between the third insulating block 131c and the second insulating block 131b. In addition, as shown in FIG. 3, the first insulating block 131a, the second insulating block 131b, and the third insulating block 131c have slopes. Specifically, the first insulating block 131a, the second insulating block 131b, and the third insulating block 131c are shaped like hills with slopes.

With the aforementioned structural configurations, the problem of cracks in the electrode pattern layer 140 disposed on the first insulating layer 130 can be effectively improved. Specifically, since the electrode pattern layer 140 is located above the opposite ends of the bridging electrode 121 by climbing up the first insulating block 131a and the second insulating block 131b, the problem of the electrode pattern layer 140 being cracked at the opposite ends of the bridging electrode 121 can be effectively improved. It should be noted that since the display device adopting the In-cell touch technology does not have the premise of spatial feature design based on the formation surface of the flat glass of the OGS-SITO architecture, the aforementioned crack problem does not exist.

As shown in FIG. 2, in the present embodiment, the exposed regions 130a, 130b are across the opposite sides of the bridging electrode 121. Hence, the contact areas between the first electrode blocks 140a1, 140a2 of the electrode pattern layer 140 and the bridging electrode 121 can be increased, thereby reducing the impedance.

Figure 4:
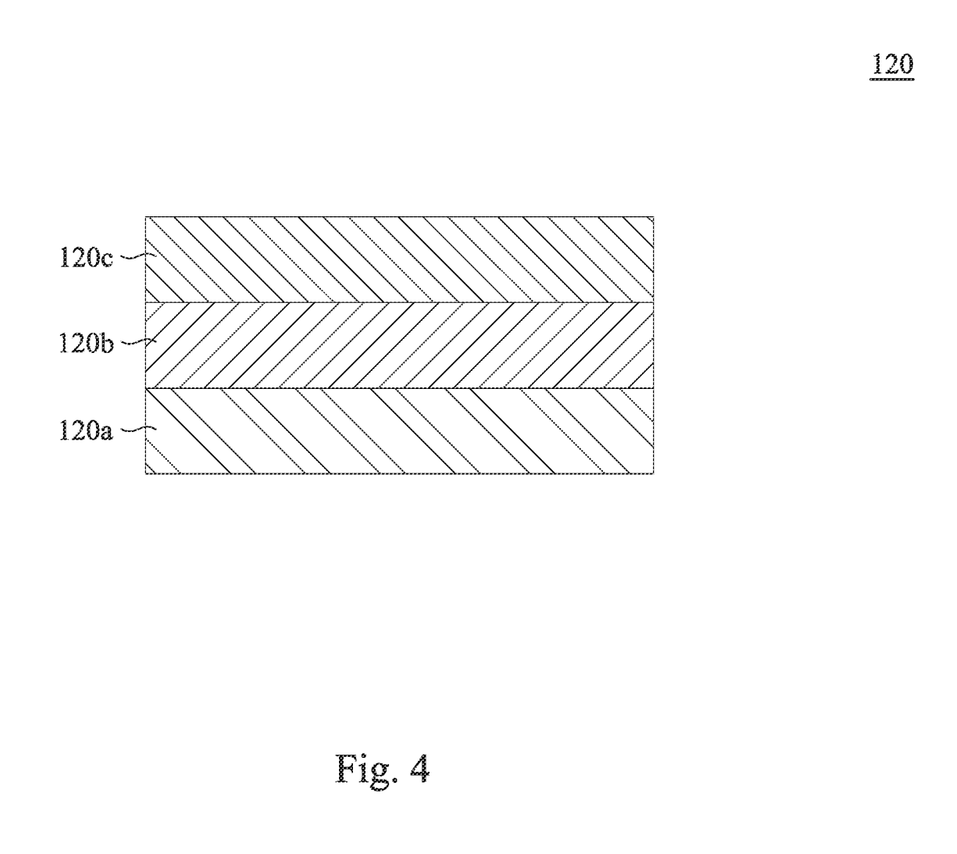
FIG. 4 is a partial cross-sectional view of a bridging pattern layer in FIG. 2.

Reference is made to FIG. 4. FIG. 4 is a partial cross-sectional view of the bridging pattern layer 120 in FIG. 2. As shown in FIG. 4, in the present embodiment, the bridging pattern layer 120 includes a copper oxide layer 120a, a metal layer 120b, and a transparent oxide conductive layer 120c. The copper oxide layer 120a, the metal layer 120b, and the transparent oxide conductive layer 120c are sequentially stacked on the substrate 110. It should be noted that since the reflectance of the copper oxide layer 120a is less than about 10%, adding the copper oxide layer 120a to the bridging pattern layer 120 can effectively improve the visual effect.

In some embodiments, a material of the metal layer 120b of the bridging pattern layer 120 may include copper, but the disclosure is not limited in this regard.

In some embodiments, a material of the transparent oxide conductive layer 120c of the bridging pattern layer 120 may include indium tin oxide, but the disclosure is not limited in this regard.

Figure 5:
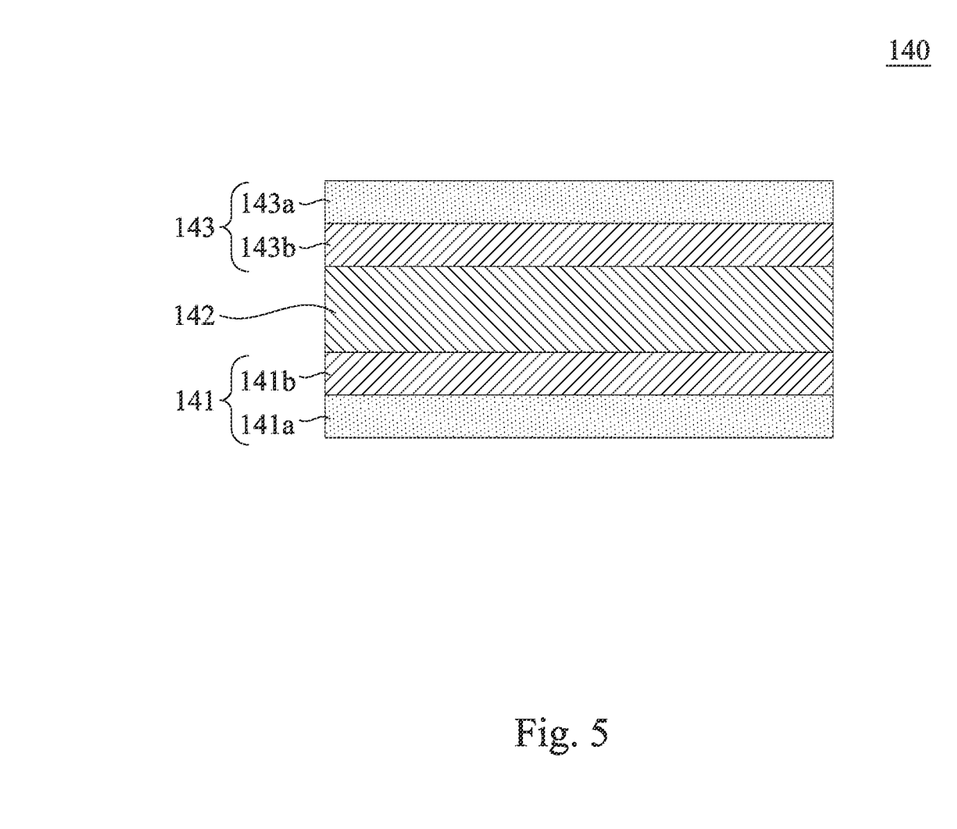
FIG. 5 is a partial cross-sectional view of an electrode pattern layer in FIG. 2.

Reference is made to FIG. 5. FIG. 5 is a partial cross-sectional view of an electrode pattern layer 140 in FIG. 2. As shown in FIG. 5, in the present embodiment, the first transparent oxide conductive layer 141 has a first region 141a and a second region 141b. An oxygen content of the first region 141a is greater than an oxygen content of the second region 141b. The second region 141b of the first transparent oxide conductive layer 141 is located between the first region 141a and the metal layer 142. The second transparent oxide conductive layer 143 has a first region 143a and a second region 143b. The second region 143b of the second transparent oxide conductive layer 143 is located between the first region 143a and the metal layer 142. With the structural configurations, the metal layer 142 can be effectively sandwiched between the second region 141b with the low oxygen content of the first transparent oxide conductive layer 141 and the second region 143b with low oxygen content of the second transparent oxide conductive layer 143, the purpose of which is to reduce unnecessary oxidation.

Table 1 below is a table of process parameters for manufacturing the electrode pattern layer 140 of Examples A to C.

TABLE 1

| | Layer 1 | | Layer 2 | | Layer 3 | Layer 4 | | Layer 5 | |
|---|---|---|---|---|---|---|---|---|---|
| | oxygen flux (sccm) | Power (kW) | oxygen flux (sccm) | Power (kW) | Power (kW) | oxygen flux (sccm) | Power (kW) | oxygen flux (sccm) | Power (kW) |
| A | 1.0 | 5.1 | 1.0 | 5.1 | 1.0 | 1.0 | 5.1 | 1.0 | 5.1 |
| B | 0.3 | 5.1 | 0.3 | 5.1 | 1.0 | 0.3 | 5.1 | 0.3 | 5.1 |
| C | 1.0 | 5.1 | 0.3 | 5.1 | 1.0 | 1.0 | 0.3 | 1.0 | 5.1 |

It should be noted that the process parameters of the layer 1 and the layer 2 in Table 1 are used when manufacturing the first region 141a and the second region 141b of the first transparent oxide conductive layer 141, respectively. The process parameters of the layer 3 are used when manufacturing the metal layer 142. The process parameters of the layer 4 and the layer 5 are used when manufacturing the second region 143b and the first region 143a of the second transparent oxide conductive layer 143, respectively. It can be seen from Table 1 above that when manufacturing the first transparent oxide conductive layer 141 and the second transparent oxide conductive layer 143 of Example A, the first regions 141a, 143a and the second regions 141b, 143b are both made of high oxygen flux (that is, 1.0 sccm). When manufacturing the first transparent oxide conductive layer 141 and the second transparent oxide conductive layer 143 of Embodiment B, the first regions 141a, 143a and the second regions 141b, 143b are both made of low oxygen flux (that is, 0.3 sccm). When manufacturing the first transparent oxide conductive layer 141 and the second transparent oxide conductive layer 143 of Example C, the first regions 141a, 143a are both made of high oxygen flux (that is, 1.0 sccm), and the second regions 141b, 143b are both made of low oxygen flux (that is, 0.3 sccm).

The Table 2 below is a table of physical parameters of the electrode pattern layer 140 of Examples A to C.

TABLE 2

| | Optical parameters | | | | | Square |
|---|---|---|---|---|---|---|
| | T % | Haze | L* in CIELAB color space | a* in CIELAB color space | b* in CIELAB color space | resistance after baking (ops) |
| A | 89.1 | 0.19 | 26.28 | 4.50 | 1.53 | 7.09 |
| B | 87.0 | 0.26 | 26.36 | 11.15 | 2.04 | 6.79 |
| C | 87.6 | 0.24 | 25.96 | 9.64 | 0.78 | 6.70 |

It can be seen from Table 2 above that the light transmittance of the electrode pattern layer 140 of Embodiment C (that is, the first transparent oxide conductive layer 141 and the second transparent oxide conductive layer 143 each include regions with different oxygen content) can be maintained below 89%, and the impedance can be maintained below 10 ops.

Figure 6:
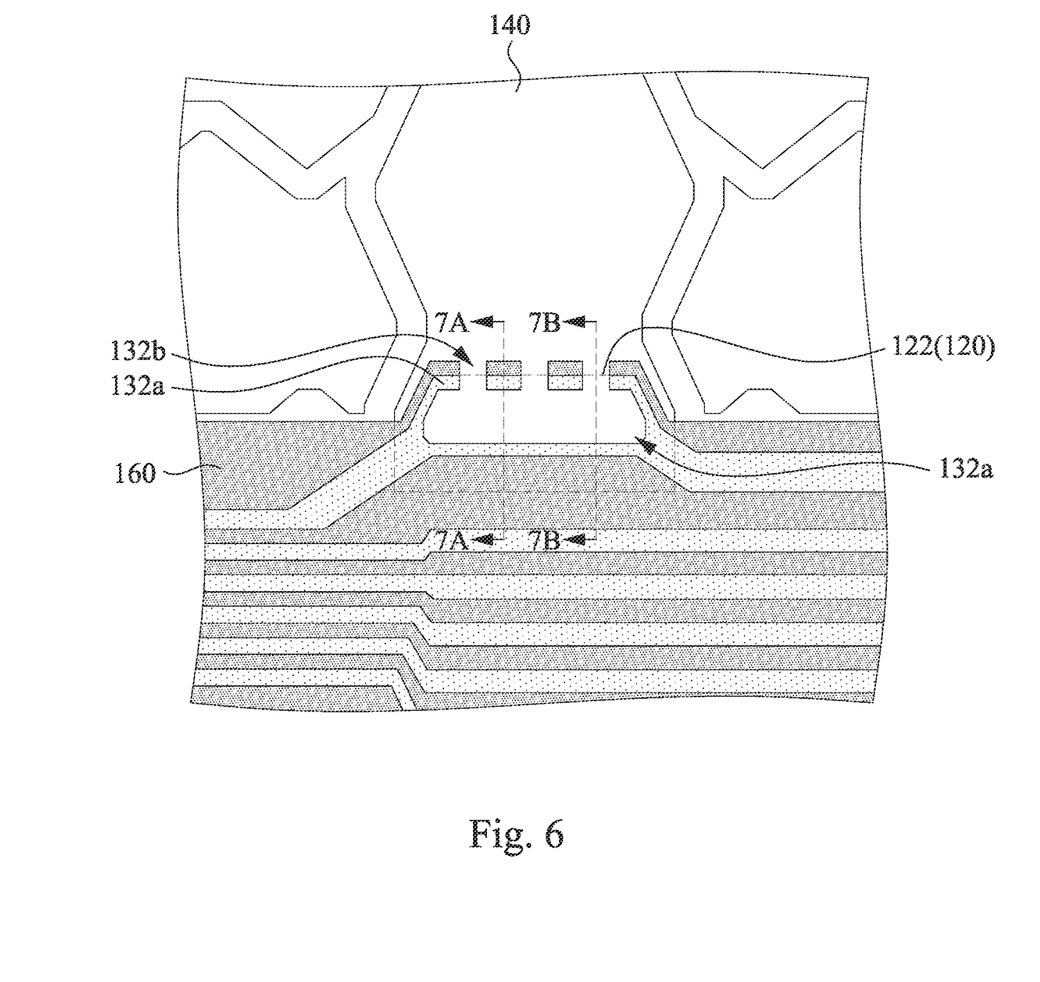
FIG. 6 is another partial enlarged view of the touch module in FIG. 1.
Figure 7A:
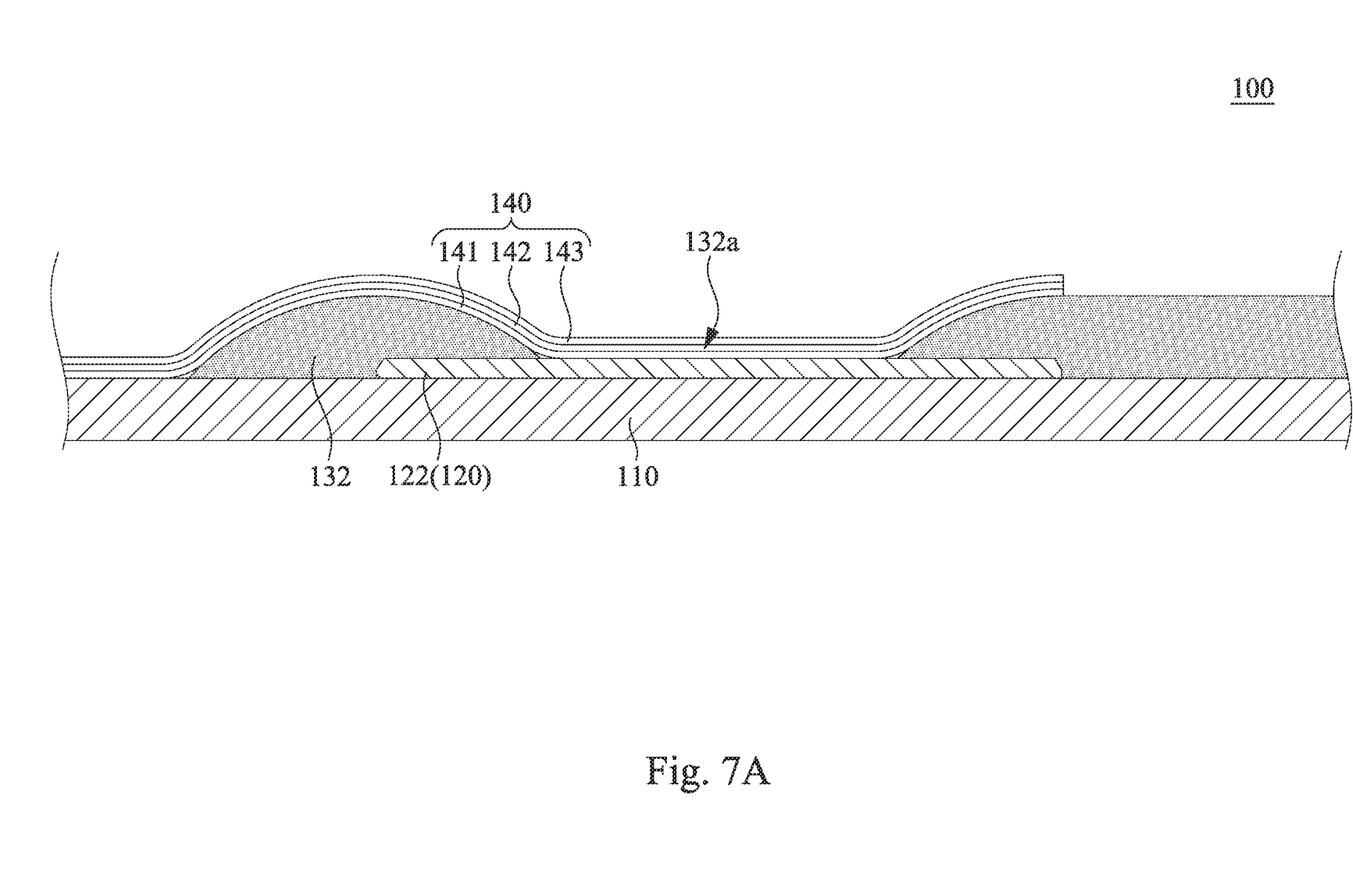
FIG. 7A is a cross-sectional view of the structure in FIG. 6 taken along line 7A-7A.
Figure 7B:
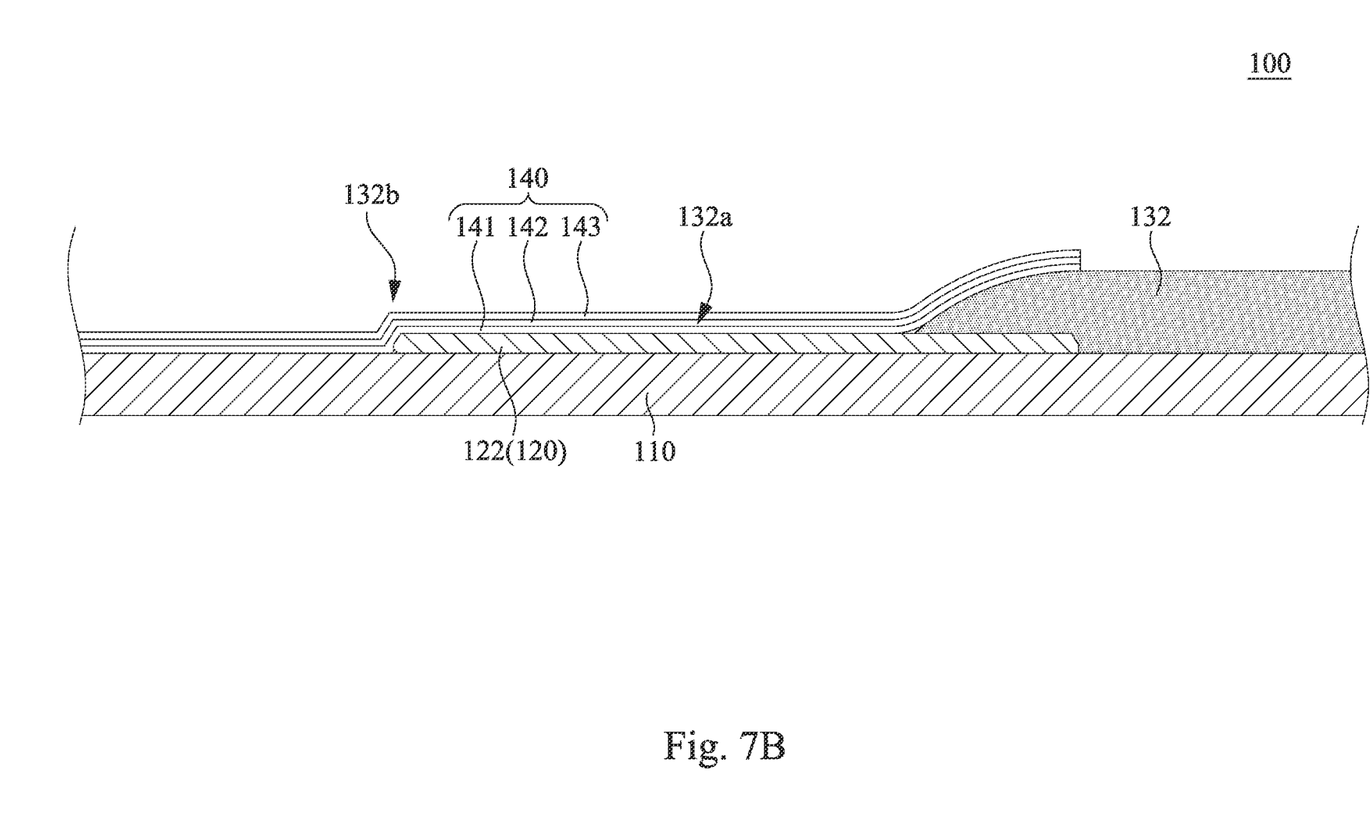
FIG. 7B is a cross-sectional view of the structure in FIG. 6 taken along line 7B-7B.

Reference is made to FIGS. 6, 7A, and 7B. FIG. 6 is another partial enlarged view of the touch module 100 in FIG. 1. FIG. 7A is a cross-sectional view of the structure in FIG. 6 taken along line 7A-7A. FIG. 7B is a cross-sectional view of the structure in FIG. 6 taken along line 7B-7B. The area depicted in FIG. 6 is at the junction of the touch zone Z1 and the peripheral zone Z2. As shown in FIGS. 6 to 7B, in the present embodiment, the bridging pattern layer 120 further includes a peripheral bonding electrode 122. The first insulating layer 130 further includes a wall structure 132. The wall structure 132 is disposed on the peripheral bonding electrode 122 and surrounds to form another exposed region 132a. The wall structure 132 has a plurality of drain trenches 132b running through the wall structure 132. Therefore, the appearance of the wall structure 132 is similar to that of a dam. The electrode pattern layer 140 is electrically connected to the peripheral bonding electrode 122 via the exposed region 132a and the drain trenches 132b. By disposing the drain trenches 132b on the wall structure 132 where the first insulating layer 130 is disposed on the peripheral bonding electrode 122, the strong etching solution used to etch the electrode pattern layer 140 can be drained when the electrode pattern layer 140 is manufactured, thereby reducing the problem of over-corrosion.

Figure 8:
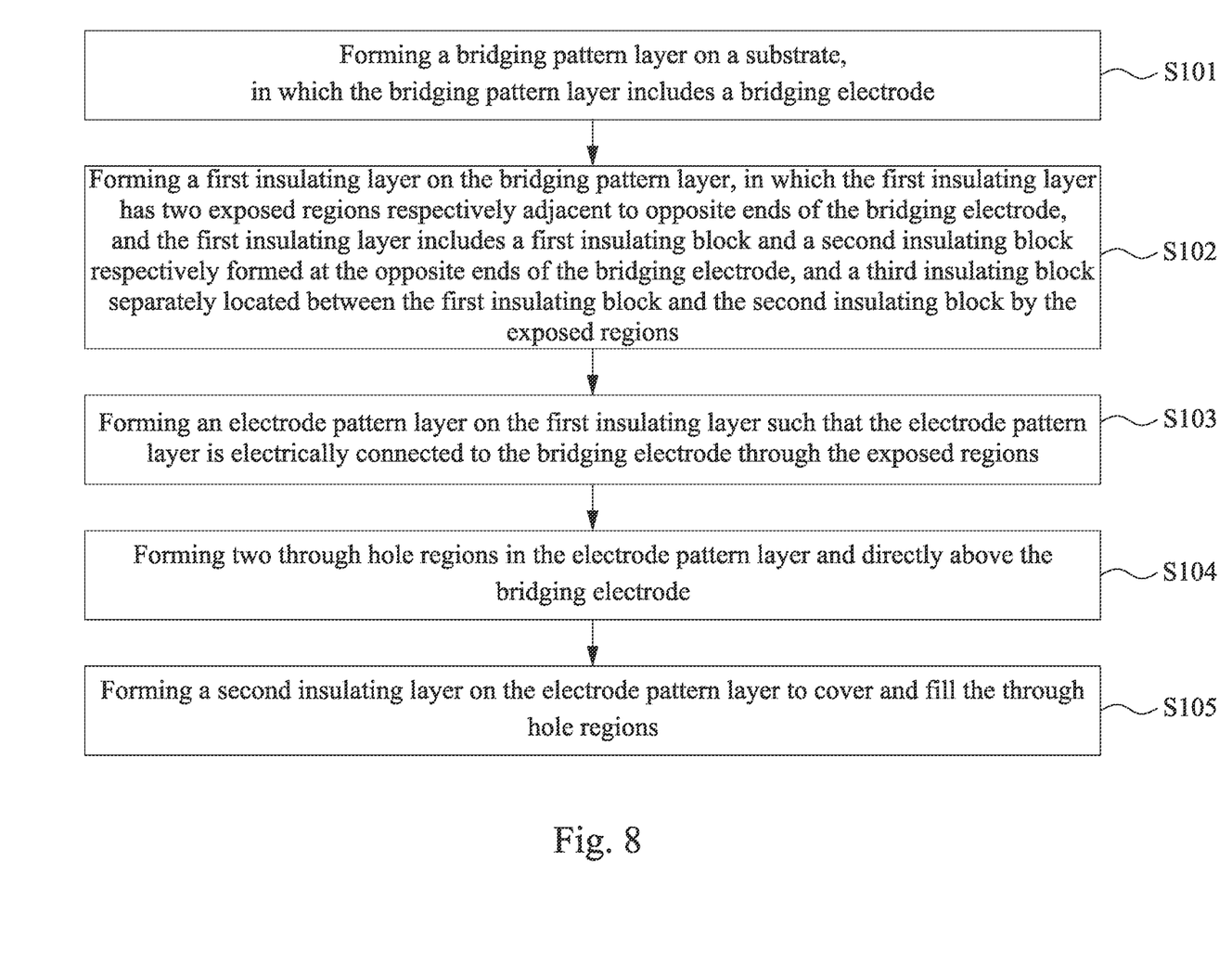
FIG. 8 is a flow chart of a method of manufacturing a touch module according to an embodiment of the present disclosure.

Reference is made to FIG. 8. FIG. 8 is a flow chart of a method of manufacturing a touch module according to an embodiment of the present disclosure. As shown in FIG. 8, the present disclosure also provides a method for manufacturing a touch module, which at least includes steps S101 to S105. The following descriptions are made in conjunction with FIGS. 1 to 7B.

Step S101: forming a bridging pattern layer 120 on a substrate 110, in which the bridging pattern layer 120 includes a bridging electrode 121.

Step S102: forming a first insulating layer 130 on the bridging pattern layer 120, in which the first insulating layer 130 has two exposed regions 130a, 130b respectively adjacent to opposite ends of the bridging electrode 121, and the first insulating layer 130 includes a first insulating block 131a and a second insulating block 131b respectively formed at the opposite ends of the bridging electrode 121, and a third insulating block 131c separately located between the first insulating block 131a and the second insulating block 131b by the exposed regions 130a, 130b.

Step S103: forming an electrode pattern layer 140 on the first insulating layer 130 such that the electrode pattern layer 140 is electrically connected to the bridging electrode 121 through the exposed regions 130a, 130b.

Step S104: forming two through hole regions 140c1, 140c2 in the electrode pattern layer 140 and directly above the bridging electrode 121.

Step S105: forming a second insulating layer 150 on the electrode pattern layer 140 to cover and fill the through hole regions 140c1, 140c2.

In some embodiments, step S102 further includes: forming an insulating material on the bridging pattern layer 120; and etching the exposed regions 130a, 130b in the insulating material, so as to form the first insulating block 131a, the second insulating block 131b, and the third insulating block 131c that is separately located between the first insulating block 131a and the second insulating block 131b by the exposed regions 130a, 130b.

In some embodiments, step S102 makes the first insulating block 131a, the second insulating block 131b, and the third insulating block 131c have slopes. Specifically, the aforementioned slopes are caused by light leakage that occurs when the insulating material is etched.

In some embodiments, step S104 further includes: etching the two through hole regions 140c1, 140c2 in the electrode pattern layer 140, so that the through hole regions 140c1, 140c2 are connected to the third insulating block 131c and across opposites sides of the third insulating block 131c.

In some embodiments, the electrode pattern layer 140 includes a first transparent oxide conductive layer 141, a metal layer 142, and a second transparent oxide conductive layer 143 that are sequentially stacked and respectively have a first resistance value, a second resistance value, and a third resistance value. Step S103 further includes: forming a first region 141a, 143a of at least one of the first transparent oxide conductive layer 141 (i.e., the first transparent conductive layer) or the second transparent oxide conductive layer 143 (i.e., the second transparent conductive layer) with a first oxygen flux; and forming a second region 141b, 143b of the at least one of the first transparent oxide conductive layer 141 or the second transparent oxide conductive layer 143 with a second oxygen flux smaller than the first oxygen flux.

In some embodiments, step S101 make the bridging pattern layer 120 further include a peripheral bonding electrode 122. Step S102 further includes: forming an insulating material on the bridging pattern layer 120; etching the insulating material to form a wall structure 132 on the peripheral bonding electrode 122, in which the wall structure 132 surrounds to form another exposed region 132a; and etching the wall structure 132 to form at least one drain trench 132b running through the wall structure 132.

In some embodiments, step S103 makes the electrode pattern layer 140 be electrically connected to the peripheral bonding electrode 122 via the exposed region 132a and the drain trench 132b.

According to the foregoing recitations of the embodiments of the disclosure, it can be seen that in the touch module of the present disclosure, since the electrode pattern layer is a composite conductive structure including two transparent oxide conductive layers with a larger resistance value and a metal layer with a smaller resistance value sandwiched between them, the resistance value of the circuit in the touch module can be effectively reduced, so that the touch module is suitable for use in medium and large-sized products. More importantly, for the composite conductive structure that is prone to cracks during multilayer formation, the present disclosure teaches that by making the first insulating layer include three insulating blocks having buffer slopes (used to improve the degree of adhesion between layers in thin film processes such as vapor deposition/coating, etc., to improve film formation at turning points) and being arranged on the bridging electrode along the extending direction of the bridging electrode, the problem of cracks in the electrode pattern layer disposed on the first insulating layer can be effectively improved. By adding a copper oxide layer to the bridging pattern layer, the visual effect can be effectively improved. By arranging the drain trenches on the wall structure where the first insulating layer is disposed on the peripheral bonding electrode, the strong etching solution used to etch the electrode pattern layer can be drained, thereby reducing the problem of over-corrosion.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method of manufacturing a touch module, comprising:
   forming a bridging pattern layer on a substrate, wherein the bridging pattern layer comprises a bridging electrode;
   forming a first insulating layer on the bridging pattern layer, wherein:
      the first insulating layer has two exposed regions respectively adjacent to opposite ends of the bridging electrode, and
      the first insulating layer comprises a first insulating block and a second insulating block respectively formed at the opposite ends of the bridging electrode and a third insulating block separately located between the first insulating block and the second insulating block by the two exposed regions;
   forming an electrode pattern layer on the first insulating layer such that the electrode pattern layer is electrically connected to the bridging electrode through the two exposed regions, wherein:
      the electrode pattern layer comprises a first transparent conductive layer, a metal layer, and a second transparent conductive layer that are sequentially stacked and respectively have a first resistance value, a second resistance value, and a third resistance value,
      the first transparent conductive layer is a first transparent oxide conductive layer,
      the second transparent conductive layer is a second transparent oxide conductive layer, and
      the forming the electrode pattern layer on the first insulating layer comprises:
         forming a first region of at least one of the first transparent oxide conductive layer or the second transparent oxide conductive layer with a first oxygen flux; and
         forming a second region of the at least one of the first transparent oxide conductive layer or the second transparent oxide conductive layer with a second oxygen flux smaller than the first oxygen flux;
   forming two through hole regions in the electrode pattern layer and directly above the bridging electrode; and
   forming a second insulating layer on the electrode pattern layer to cover and fill the two through hole regions.

2. The method of claim 1, wherein the forming the first insulating layer on the bridging pattern layer comprises:
   forming an insulating material on the bridging pattern layer; and
   etching the two exposed regions in the insulating material, so as to form the first insulating block, the second insulating block, and the third insulating block.

3. The method of claim 2, wherein the etching the two exposed regions in the insulating material makes the first insulating block, the second insulating block, and the third insulating block have slopes.

4. The method of claim 2, wherein the forming the two through hole regions in the electrode pattern layer and directly above the bridging electrode comprises:
   etching the two through hole regions in the electrode pattern layer, so that the two through hole regions are connected to the third insulating block and across opposites sides of the third insulating block.

5. The method of claim 1, wherein the forming the bridging pattern layer on the substrate makes the bridging pattern layer further comprise a peripheral bonding electrode, and the forming the first insulating layer on the bridging pattern layer further comprises:
   forming an insulating material on the bridging pattern layer;
   etching the insulating material to form a wall structure on the peripheral bonding electrode, wherein the wall structure surrounds to form another exposed region; and
   etching the wall structure to form at least one drain trench running through the wall structure.

6. The method of claim 5, wherein the forming the electrode pattern layer on the first insulating layer makes the electrode pattern layer be electrically connected to the peripheral bonding electrode via the another exposed region and the at least one drain trench.

7. A touch module, comprising:
   a substrate;
   a bridging pattern layer disposed on the substrate and comprising a bridging electrode;
   a first insulating layer disposed on the bridging pattern layer and having two exposed regions respectively adjacent to opposite ends of the bridging electrode, wherein the first insulating layer comprises a first insulating block and a second insulating block respectively formed at the opposite ends of the bridging electrode and a third insulating block separately located between the first insulating block and the second insulating block by the two exposed regions;
   an electrode pattern layer disposed on the first insulating layer and electrically connected to the bridging electrode through the two exposed regions, the electrode pattern layer comprising a first transparent conductive layer, a metal layer, and a second transparent conductive layer that are sequentially stacked and respectively have a first resistance value, a second resistance value, and a third resistance value, wherein:
      the first transparent conductive layer is a first transparent oxide conductive layer,
      the second transparent conductive layer is a second transparent oxide conductive layer,
      at least one of the first transparent oxide conductive layer or the second transparent oxide conductive layer has a first region and a second region,
      an oxygen content of the first region is greater than an oxygen content of the second region, and
      the electrode pattern layer has two through hole regions directly above the bridging electrode; and
   a second insulating layer disposed on the electrode pattern layer and covering and filling the two through hole regions.

8. The touch module of claim 7, wherein the first insulating block, the second insulating block, and the third insulating block have slopes.

9. The touch module of claim 7, wherein the two through hole regions are connected to the third insulating block and across opposites sides of the third insulating block.

10. The touch module of claim 7, wherein the two exposed regions are across opposite sides of the bridging electrode.

11. The touch module of claim 7, wherein the electrode pattern layer comprises:
two first electrode blocks electrically connected to the bridging electrode respectively through the two exposed regions; and
a second electrode block separately located between the two first electrode blocks by the two through hole regions.

12. The touch module of claim 7, wherein the bridging pattern layer comprises a copper oxide layer disposed on the substrate.

13. The touch module of claim 12, wherein the bridging pattern layer further comprises a metal layer stacked on the copper oxide layer.

14. The touch module of claim 13, wherein the bridging pattern layer further comprises a transparent oxide conductive layer stacked on the metal layer.

15. The touch module of claim 7, wherein the second region is located between the first region and the metal layer.

16. The touch module of claim 7, wherein the bridging pattern layer further comprises a peripheral bonding electrode, the first insulating layer further comprises a wall structure, the wall structure is disposed on the peripheral bonding electrode and surrounds to form another exposed region, the electrode pattern layer is electrically connected to the peripheral bonding electrode at least via the another exposed region, and the wall structure has at least one drain trench running through the wall structure.

17. The touch module of claim 16, wherein the electrode pattern layer is further electrically connected to the peripheral bonding electrode via the at least one drain trench.

18. A touch module, comprising:
a substrate;
a bridging pattern layer disposed on the substrate and comprising a bridging electrode;
a first insulating layer disposed on the bridging pattern layer and having two exposed regions respectively adjacent to opposite ends of the bridging electrode, wherein the first insulating layer comprises a first insulating block and a second insulating block respectively formed at the opposite ends of the bridging electrode and a third insulating block separately located between the first insulating block and the second insulating block by the two exposed regions;
an electrode pattern layer disposed on the first insulating layer and electrically connected to the bridging electrode through the two exposed regions, the electrode pattern layer comprising a first transparent conductive layer, a metal layer, and a second transparent conductive layer that are sequentially stacked and respectively have a first resistance value, a second resistance value, and a third resistance value, wherein the electrode pattern layer has two through hole regions directly above the bridging electrode; and
a second insulating layer disposed on the electrode pattern layer and covering and filling the two through hole regions,
wherein the bridging pattern layer further comprises a peripheral bonding electrode, the first insulating layer further comprises a wall structure, the wall structure is disposed on the peripheral bonding electrode and surrounds to form another exposed region, the electrode pattern layer is electrically connected to the peripheral bonding electrode at least via the another exposed region, and the wall structure has at least one drain trench running through the wall structure.

19. The touch module of claim 18, wherein the electrode pattern layer is further electrically connected to the peripheral bonding electrode via the at least one drain trench.

20. The touch module of claim 18, wherein the first insulating block, the second insulating block, and the third insulating block have slopes.

* * * * *